(12) United States Patent
Aoki

(10) Patent No.: US 7,039,609 B2
(45) Date of Patent: May 2, 2006

(54) AUCTION SYSTEM, AUCTION SERVER, USER TERMINAL, AUCTION METHOD, BIDDING METHOD, STORAGE MEDIA AND PROGRAM TRANSMISSION APPARATUS

(75) Inventor: Yoshinori Aoki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/790,732

(22) Filed: Feb. 22, 2001

(65) Prior Publication Data
US 2001/0039531 A1 Nov. 8, 2001

(30) Foreign Application Priority Data
Apr. 28, 2000 (JP) ............................ 2000-130937

(51) Int. Cl.
*G06Q 30/00* (2006.01)
*G06Q 40/00* (2006.01)

(52) U.S. Cl. ...................................................... 705/37
(58) Field of Classification Search .................. 705/37, 705/8
See application file for complete search history.

(56) References Cited

U.S. PATENT DOCUMENTS

| | | | |
|---|---|---|---|
| 5,640,569 A * | 6/1997 | Miller et al. ................. | 710/241 |
| 6,272,473 B1 * | 8/2001 | Sandholm ..................... | 705/37 |
| 6,374,227 B1 * | 4/2002 | Ye .................................. | 705/8 |
| 6,718,312 B1 * | 4/2004 | McAfee et al. ................ | 705/37 |
| 6,952,682 B1 * | 10/2005 | Wellman ...................... | 705/37 |
| 2001/0034662 A1 * | 10/2001 | Morris ......................... | 705/26 |
| 2002/0013757 A1 * | 1/2002 | Bykowsky et al. ............ | 705/37 |
| 2003/0233305 A1 * | 12/2003 | Solomon ...................... | 705/37 |
| 2005/0165670 A1 * | 7/2005 | Woodmansey et al. ....... | 705/37 |

FOREIGN PATENT DOCUMENTS

JP 10-11137 A * 1/1998
JP 2000-113070 4/2000

OTHER PUBLICATIONS

Anon., "NTIA Under Fire for Requesting Spectrum Auction Study Funds," Spectrum Report, vol. 2, No. 16, Sep. 1992.*
Anon., "Stanford Busnss School: Stanford Economist Milgrom Chosen for Nobel Seminar," Business Wire, Nov. 6, 1996.*
The Microsoft Press Computer Dictionary, Third Edition, Microsoft Press, Redmond, 1997, pp. 302, 311, and 312.*
Sandholm, T., "Automated Negotiation," Communications of the ACM, vol. 42, No. 3, pp. 84-85, Mar. 1999.*
Kutanoglu, E., et al., "On Combinatorial Auction and Lagrangean Relaxation for Distributed Resource Scheduling," IIE Trasnactions, vol. 31, No. 9, p. 813, Sep. 1999.*
U.S. Appl. No. 09/626,946, filed Jul. 27, 2000, B. Dietrich and J. J. Forrest.

* cited by examiner

*Primary Examiner*—Nicholas D. Rosen
(74) *Attorney, Agent, or Firm*—Ido Tuchman; Anne Dougherty

(57) ABSTRACT

An auction system for providing an auction service via a communication network comprises an auction server machine and buying user terminals which are connected to the communication network; wherein the buying user terminals specify a single item or any combination of items for bidding when multiple items are sold as grouped items at the auction held by the auction server machine; and the auction server machine decides on successful bidders for bids made on a variety of combinations of the grouped items from the buying user terminals, such that the items composing the grouped items do not overlap to multiple bidders and the total price becomes maximal.

13 Claims, 5 Drawing Sheets

300

Item information

Grouping    ◯ Yes   ◯ No

Minimum price [          ] yen

Starting price
of bidding [          ] yen

Time for
acceptance
of bidding [          ]

[Send] — 301

Fig. 3

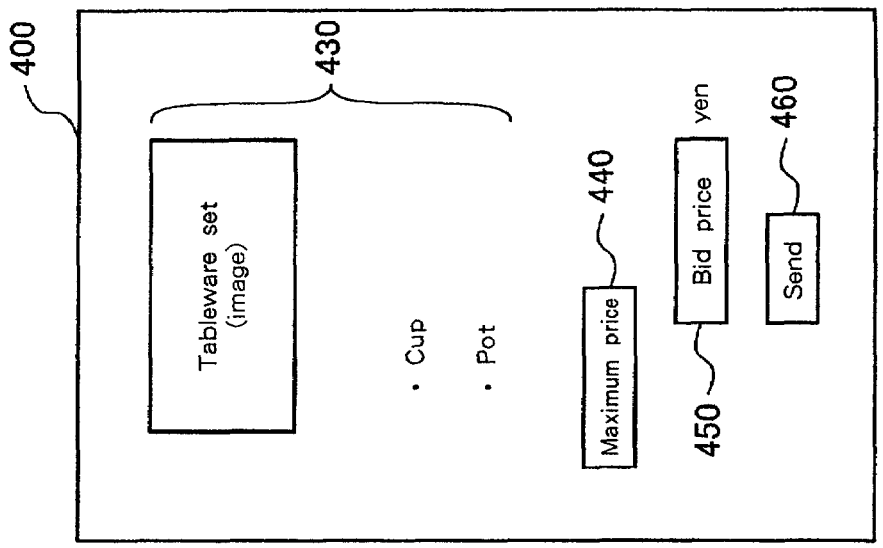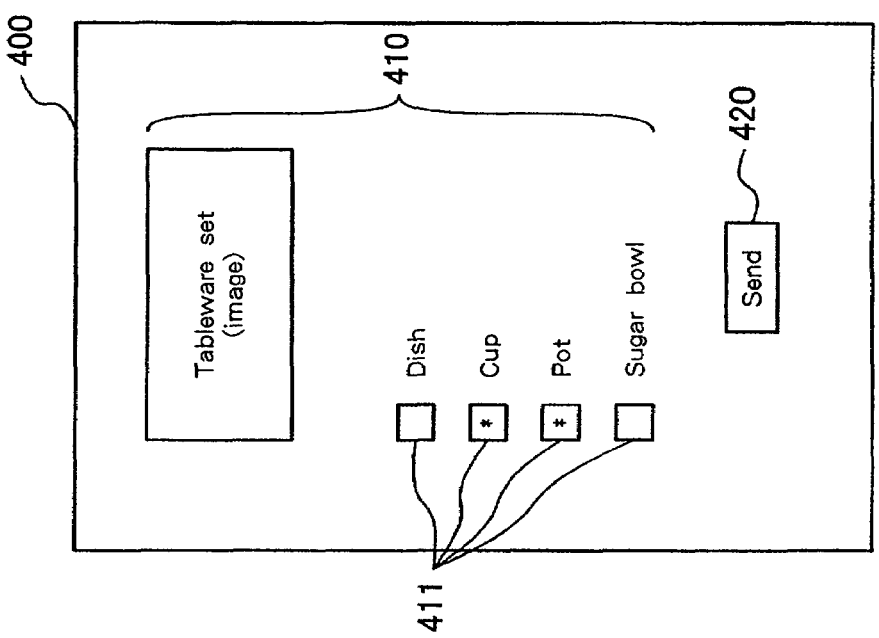
Fig. 4

AUCTION SYSTEM, AUCTION SERVER, USER TERMINAL, AUCTION METHOD, BIDDING METHOD, STORAGE MEDIA AND PROGRAM TRANSMISSION APPARATUS

FIELD OF THE INVENTION

The present invention relates to an auction system for providing a network auction utilizing a communication network.

BACKGROUND OF THE INVENTION

Discussion of Background Art

Today, a network auction (hereinafter simply referred to as auction) is widely utilized as one form of electronic commerce utilizing a communication network such as the Internet. There are many sites that provide an auction system.

A variety of auction systems provided by these conventional auction sites can not flexibly set a unit of exhibits, when there are multiple items a seller wants to sell. For example, considering the case when a tableware set, a series of items, or books are put on sale, even if a seller puts them up for auction individually to easily achieve the trade, there might be a case where a buyer who intends to buy in bulk be treated preferentially despite the selling price of a single item becoming somewhat cheaper, in order to maximize the total price. On the other hand, from a buyer's viewpoint, even if these sets or series of items are exhibited collectively, he or she might want to buy only a part of them.

However, in conventional auctions, when exhibiting multiple items collectively in this way (hereinafter, the whole of items is referred to as grouped items), it was impossible to dynamically change a unit of items subject to auction depending on requests from sellers and bids from buyers. For that reason, it was impossible to treat a buyer preferentially who intends to buy in bulk when multiple items are exhibited individually, or for a buyer who wants to buy only a part of items to participate in an auction, when they are exhibited as grouped items.

PROBLEMS TO BE SOLVED BY THE INVENTION

As mentioned above, heretofore, auction systems that implement an auction on a communication network have provided a variety of techniques as options for the auction, however, it was impossible to dynamically change a unit of items subject to auction depending on requests from sellers and bids from buyers, when multiple items are exhibited as a subject for auction.

Therefore, a flexible trade was impossible, such as, for example, treating a buyer preferentially who intends to buy in bulk even if the selling price of a single item becomes somewhat cheaper. Thus, the total price could not be necessarily maximized even if a single item was sold at a higher price.

Now a concrete example will be described.

Let's consider the case where exhibiting three items A, B and C individually, wherein the item A and item B are bid at 1000 yen, whereas the item C has not been bid yet. Assuming that there is a buyer(a) who wants to buy the items A, B and C collectively at 2500 yen, the buyer(a) must bid a price higher than 1000 yen for the item A and B to make a successful bid. Then, he will bid a price less than 500 yen for the item C. If the buyer(a) were to bid 1100 yen for the items A and B and 300 yen for the item C, he could not bid the item C successfully if another buyer(b) bids 400 yen for the item C later. Furthermore, assuming that the items A, B and C are about the same value of items, and that the items A and B are bid at 1100 yen, while the item C is bid at 300 yen, there is a high possibility that there appears a buyer who intends to buy the item C at a price a little higher than 300 yen. Since the buyer(a) wants to buy the items A, B and C collectively, how to bid in this way is not preferable.

On the other hand, from a seller's viewpoint, as the price the buyer(a) quoted is 2500 yen in all, including the items A, B and C, if the items A, B and C are about the same value of items, each item is considered to be about 830 yen, which is cheaper than 1000 yen that has already been set for the items A and B. However, if the items A and B had been knocked down to result in 2000 yen, the total price would be smaller than the case of being knocked down to the buyer(a). If a buyer(b) for the item C appears, the total price becomes 2400 yen in the above example, where the benefit is smaller than the case of being knocked down to the buyer(a).

Also, when multiple items are exhibited as grouped items collectively, a person who wants to buy only a part of them can not participate in the auction with bidding. Therefore, it was impossible to negotiate with such potential customers. Even if individually conducting negotiations for buying and selling a part of the grouped items using an E-mail for example, as the number of bids becomes great, it takes a lot of trouble with calculating which combination makes the greatest profit for a seller. Also, it is a burden on a seller to write an E-mail for negotiations to each buyer. Furthermore, since the auction itself is conducted with aiming at grouped items, it is impossible for a buyer to understand the progress of trading negotiations concerning the combination he or she desires. Therefore, the buyer can not know at what price he or she can buy up the desired combination of items.

SUMMARY OF THE INVENTION

It is therefore an object of the present invention to flexibly and dynamically set a unit of items subject to auction when multiple items are exhibited collectively at an auction.

It is another object of the invention to allow a buyer to participate in the auction such that the auction is hypothetically conducted in relation to any selected combination or individual items, when multiple items are exhibited collectively at the auction.

In a first aspect of the present invention, there is provided an auction system for providing an auction service via a communication network, the system comprising an auction server and user terminals which are connected to the communication network; wherein the user terminals specify a single item or any combination of items for bidding when multiple items are sold as grouped items at the auction held by the auction server; and the auction server decides on successful bidders for bids made on a variety of combinations of the grouped items from the user terminals, such that the items composing the grouped items do not overlap to multiple bidders. According to this configuration, a buyer can bid for the items excluding unwanted items among grouped items that are exhibited at an auction.

The auction server selects a combination of bids that maximizes a total amount of bids among a variety of combinations of bids for the grouped items, and decides on each buyer who made such bids as a successful bidder. According to this configuration, a selling user can sell the items with the maximal total price, that is, he or she can make a maximum profit.

The auction server calculates what price should be bid for the combination of items that was specified by the user terminal, in order to maximize the total amount of bids for all items with ensuring this combination of items; and presents the obtained price to this user terminal as a maximum bidding price so far for this combination of items. According to this configuration, a buying user can make a bid as if the auction were conducted for the combination of items he or she has selected among the grouped items.

In another aspect of the invention, there is provided an auction server assisting a network auction to bid for items subject to auction via a communication network, the auction server comprising: item-introduction means for publishing items subject to auction on the communication network; bid accepting means for accepting a bid for a single item or any combination of items when multiple items are sold as grouped items; and total amount maximizing means for determining a combination of bids that maximizes a total amount of bids among a variety of combinations of bids for items accepted by the bid accepting means, wherein after the time for acceptance of bidding elapsed, deciding on each buyer who made a bid corresponding to the combination determined by the total amount maximizing means as a successful bidder.

The auction server further includes bid calculating means for calculating what price should be bid for the combination of items subject to bidding in order to maximize the total amount of bids for all items, with ensuring this combination of items; and presents the obtained price by the bid calculating means to a buyer who intends to bid for this combination of items as a maximum bidding price so far for this combination of items.

The bid calculating means makes the total amount maximizing means determine a combination A of bids that maximizes the amount of bids, among bids that have already been made for items in the grouped items excluding the combination of items subject to bidding; and among all bids that have already been made for the grouped items and the items that compose the grouped items, finds a total amount of bids for a combination B that maximizes the total amount; and subtracts the total amount for the combination A from the total amount for the combination B; and sets the result as the maximum amount for the combination of items subject to bidding.

According to this configuration, a buying user can participate in an auction such that the auction is hypothetically conducted in relation to the items which he or she has selected among the grouped items.

Furthermore, when a bid has already been made for the same combination as the combination of items subject to bidding, and this past bid is included in the combination determined by the total amount maximizing means, the bid calculating means sets this past bid as a maximum bidding price so far for this combination of items.

According to this configuration, it is possible to present the maximum bidding price for this combination of items to buying users without calculating it, so that it is possible to lighten the burden imposed on the auction server and to speed up the processing.

In a further aspect of the invention, there is provided a user terminal connecting to an auction server via a communication network, participating in a network auction held on the communication network, and bidding for items subject to auction, the user terminal comprising: item specifying means for specifying a single item or any combination of items for bidding when multiple items are sold as grouped items and sending the specified items to the auction server; maximum amount presenting means for presenting a maximum bidding price so far for the items specified for the bidding that was received from the auction server; and bidding means for inputting and sending bids to the auction server.

The maximum amount presenting means receives a necessary amount for the combination of items specified by the item specifying means from the auction server, such that a total amount of bids reaches the maximum among a variety of combinations of bids for items that compose the grouped items, and presents the received amount as a maximum bidding price so far for this combination of items.

In a further aspect of the invention, there is provided an auction method for performing a network auction via a communication network using an auction server, the method comprising the steps of: publishing items subject to auction on the communication network; accepting a bid for a single item or any combination of items when multiple items are sold as grouped items; determining a combination of bids that maximizes a total amount of bids among a variety of combinations of bids for items accepted; and after the time for acceptance of bidding elapsed, deciding on each buyer who made a bid that maximizes the total amount of bids as a successful bidder.

The above accepting step comprises the steps of: calculating what price should be bid for the combination of items subject to bidding in order to maximize the total amount of bids for all items including this combination; and presenting the obtained price to a buyer who intends to bid for this combination of items as a maximum bidding price for this combination of items.

More specifically, the above calculating step comprises the steps of: excluding an aggregate P of items subject to bidding from the grouped items to find an aggregate Q of remaining items; excluding an aggregate X of buyers who have bid for the items included in the aggregate P, from all buyers who have bid for the grouped items and the items that compose the grouped items, thereby finding an aggregate Y of remaining buyers; passing the aggregate Q of items and the aggregate Y of buyers to the determining step to calculate the maximum bidding price; among all bids that have already been made for the grouped items and the items that compose the grouped items, finding a total amount of bids for a combination that maximizes the total amount; and subtracting from this total amount the total amount calculated based on the aggregate Q of items and the aggregate Y of buyers.

In a further aspect of the invention, there is provided an auction method for performing an auction via a communication network using an auction server and user terminals connected to the communication network, the method comprising the steps of: the user terminals specifying a single item or any combination of items for bidding when multiple items are sold as grouped items at the auction held by the auction server; and the auction server deciding on successful bidders for bids made on a variety of combinations of the grouped items from the user terminals, such that the items composing the grouped items do not overlap to multiple bidders and the total price for the grouped items becomes maximal.

The above step for deciding on successful bidders includes the steps of: calculating at any time a combination of bids that maximizes a total amount of bids among a variety of combinations of bids for items; and after the time for acceptance elapsed, deciding on each buyer who made a combination of bids that maximizes the total amount of bids at that time as a successful bidder.

In a further aspect of the invention, there is provided an auction method for performing an auction via a communication network using an auction server and user terminals connected to the communication network, the method comprising the steps of: the user terminals specifying a single item or any combination of items for bidding when multiple items are sold as grouped items at the auction held by the auction server; the auction server calculating what price should be bid for the item or the combination of items that were specified by the user terminals, in order to maximize the total amount of bids for all items with ensuring this combination of items; the auction server presenting the obtained price to the user terminal as a maximum bidding price for this item or the combination of items; the user terminal bidding a price higher than the presented maximum amount; and the auction server deciding on successful bidders for bids made on the grouped items from the user terminals, such that the items composing the grouped items do not overlap to multiple bidders and the total price for the grouped items becomes maximal.

In a further aspect of the invention, there is provided a bidding method for connecting to an auction server via a communication network, participating in a network auction held on the communication network, and bidding for items subject to auction, the method comprising the steps of: specifying a single item or any combination of items for bidding when multiple items are sold as grouped items and sending the specified items to the auction server; presenting a maximum bidding price so far for the items specified for the bidding that was received from the auction server; and inputting and sending bids to the auction server.

The above presenting step receives a necessary amount for the specified combination of items as a maximum bidding price so far for this combination of items, such that a total amount of bids reaches to the maximum among a variety of combinations of bids for items that compose the grouped items.

Also, the present invention is provided as a storage medium for storing a program to perform each step of the above auction method in a form which a computer's input means can read.

Furthermore, the present invention is provided as a program transmission apparatus including a storage means for storing such a program and transmission means for reading and transmitting this program from the storage means.

BRIEF DESCRIPTION OF THE DRAWINGS

FIG. 3 is a diagram showing a sample configuration of the web page for exhibition used in the embodiment of the present invention.

FIGS. 4(A) and (B) are diagrams showing a sample configuration of a web page for bidding used in the embodiment of the present invention.

DETAILED DESCRIPTION OF INVENTION

Now the present invention will be described referring to the attached drawings.

First, the outline of the present invention will be described. In the auction implemented by the present invention, a buying user is permitted to bid for a desired combination (including the case of a single item) when multiple items are exhibited as grouped items collectively. Successful bidders are determined among a variety of combinations of bids such that a bidder of individual items does not overlap and the total price of the combination becomes maximal. For the grouped items, various forms are conceivable, for example, a tableware set including different items, a certain number of the same items put together, and a series of items, etc. It is also possible to exhibit essentially unrelated items as grouped items in compliance with the users' requests.

Figure 1:
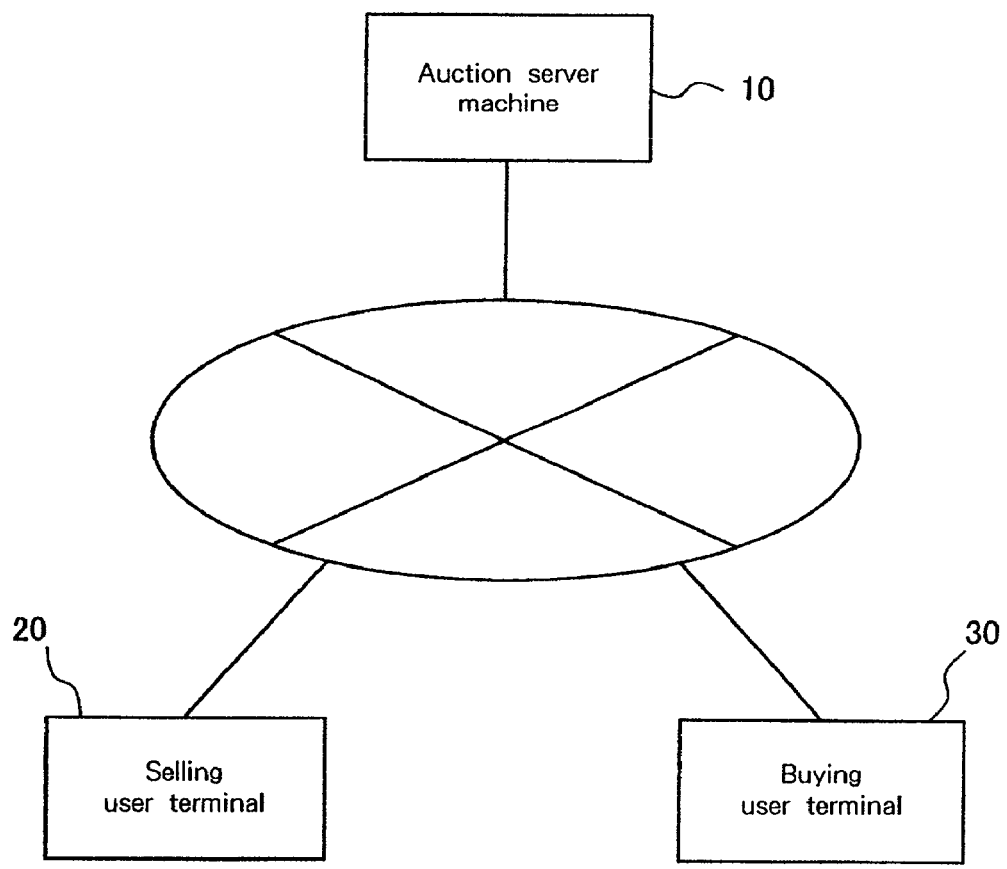
FIG. 1 depicts a diagram illustrating an overall configuration of an auction system according to the embodiment of the present invention.

FIG. 1 depicts a diagram illustrating an overall configuration of an auction system which implements the above auction according to the embodiment of the present invention. In FIG. 1, a symbol 10 is an auction server machine, which connects to the Internet or other communication networks to implement a network auction. A symbol 20 is a selling user terminal, which a user uses to participate in the auction held in the auction server machine 10 as a seller. A symbol 30 is a buying user terminal, which a user uses to participate in the auction held in the auction server machine 10 as a buyer.

In the following explanation, it is assumed that the auction is held on a communication network corresponding to HTML, such as the Internet.

In the above configuration, the auction server machine 10 is implemented by a workstation, a personal computer, or other computer systems and has a function as a web server that conducts an auction using a web page. The auction server machine 10 has web pages for exhibiting items at an auction (hereinafter referred to as web page for exhibition) and web pages for bidding for items subject to auction (hereinafter referred to as web page for bidding), and provides them to a user terminal that intends to participate in the auction.

The selling user terminal 20 and the buying user terminal 30 are implemented by a computer system such as a workstation or a personal computer, a PDA (Personal Digital Assistant), or other communication terminals, and has a web browser for participating in an auction via web pages.

Between the selling user terminal 20 and the buying user terminal 30, there is only a difference of positions whether to participate in the auction as a seller or buyer. That is, even if a terminal uses the same terminal, when it participates in the auction as a seller, it becomes a selling user terminal 20, whereas when it participates in the auction as a buyer, it becomes a buying user terminal 30. More specifically, a given terminal downloads and displays web pages for exhibition from the auction server machine 10 to operate as a selling user terminal 20. Also, a given terminal downloads and displays web pages for bidding from the auction server machine 10 to operate as a buying user terminal 30.

Figure 2:
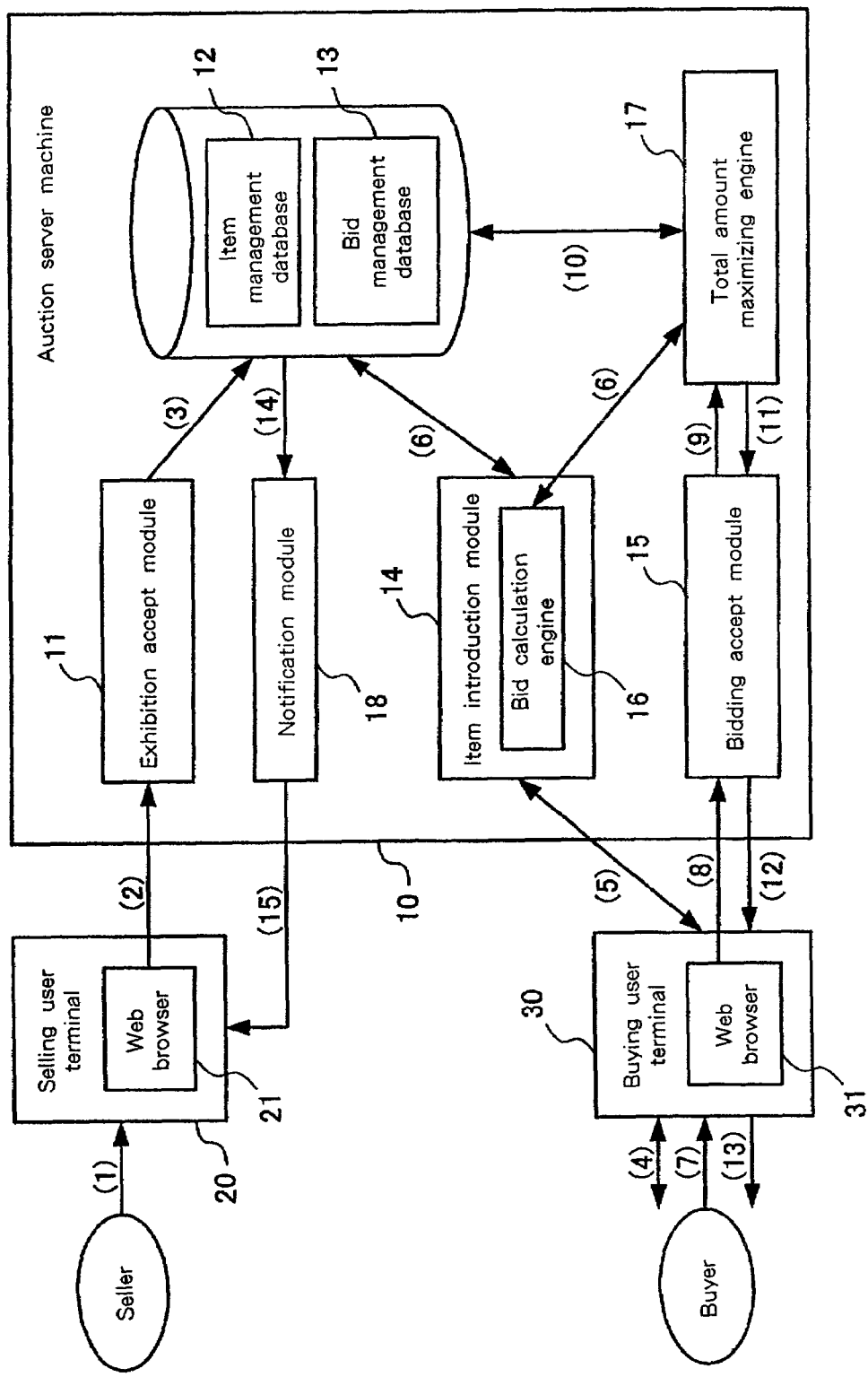
FIG. 2 depicts a diagram illustrating a configuration of an auction server machine according to the embodiment of the present invention.

FIG. 2 depicts a diagram illustrating a configuration of an auction server machine 10 according to an embodiment of the present invention.

Referring to FIG. 2, the auction server machine 10 includes an exhibition accept module 11 for accepting an exhibition of items subject to auction from a selling user, an item management database 12 for managing information about items exhibited at an auction, a bid management database 13 for managing the condition of bidding for items subject to auction, an item introduction module 14 for introducing items to a buying user, a bidding accept module 15 for accepting bidding from a buying user, a bid calculation engine 16 provided in the item introduction module 14 for calculating the maximum price for items depending on the condition of bidding, a total amount maximizing engine 17 for determining a combination of bids resulting in the maximum amount, and the notification module 18 for notifying a selling user of the result of the closing bids.

Referring to FIG. 2, an overall operation of an auction will be described according to an embodiment of the present invention.

First, a selling user operates the selling user terminal 20 to download web pages for exhibition from the auction server machine 10, and displays the web pages for exhibition on the web browser 21, and inputs information about items he or she will exhibit at an auction (shown by (1) and (2) in FIG. 2). When exhibiting multiple items, an operation to group the multiple items (i.e., exhibiting as the grouped items) should be input as well.

FIG. 3 is a diagram showing a sample configuration of the web page for exhibition.

As described above, the web page for exhibition 300 is provided on the auction server machine 10, and the selling user terminal 20 downloads it from the auction server machine 10. The web page for exhibition 300 is created using HTML for example, and as is shown in FIG. 3, besides the aforementioned item information and information about grouping or not, information about the auction such as a minimum price, a starting price of bidding, and a time for acceptance of bidding would be input. Furthermore, when multiple items are exhibited as a group, information about the auction like minimum price can be set either for individual items composing the grouped items or for the entire grouped items. By inputting necessary information to this web page for exhibition 300 and clicking the send button 301, the items are registered with the auction server machine 10 and exhibited as items subject to auction.

When the auction server machine 10 accepts an input from a selling user terminal 20 at the exhibition accept module 11, it stores the item information to the item management database 12 (shown by (3) in FIG. 2). Although not shown in FIG. 2, the auction server machine 10 has a module for totally managing and controlling the whole operation, which after accepting the input from the selling user terminal 20, conducts an auction based on the information about the auction presented by the selling user. That is, it raises bids for items subject to auction from buying users, decides on successful bidders after the time for acceptance of bidding elapsed, and notifies the sellers and buyers of the result of the closing bids.

In order to raise bids from buying users, the auction server machine 10 introduces the items subject to auction based on the inputs from the selling users, creates the web page for bidding to accept bidding, and sends the web page for bidding to buying users in response to an access from users who intend to participate in the auction as a buyer.

FIGS. 4(A) and (B) are diagrams showing a sample configuration of a web page for bidding. The web page shown in FIG. 4(A) includes an item introduction field 410 to introduce items subject to auction, and a send button 420 to go to the next page shown in FIG. 4(B). When multiple items are collectively subject to auction as grouped items, individual items composing the grouped items are listed in the item introduction field 410, and further check boxes 411 are appended to each item, as is shown in the drawing. Also in the item introduction field 410, image information like a photograph is presented if required. Concerning the grouped items, an icon for perusing each item composing the group (i.e., for displaying a web page which describes information about each item) may be displayed. A buying user selects any combination of items (or a single item) from the items listed in the item introduction field 410 and checks their check boxes 411, then clicks the send button 420 to go to a web page shown in FIG. 4(B).

In the web page shown in FIG. 4(B), there are provided an item display field 430 for displaying items selected in FIG. 4(A), a maximum price field 440 for displaying a maximum price for those items or its combination, a bid input field 450 for inputting a bid, and a send button 460. A buying user determines a bid referring to the price displayed in the maximum price field 440, and after inputting the determined bid into the bid input field 450, clicks the send button 460 to bid for those items.

A buying user operates the buying user terminal 30 to download the aforementioned web page for bidding 400 from the auction server machine 10 and to display it on the web browser 31, and makes a bid (shown by (4)–(6) in FIG. 2). More specifically, first the buying user displays the web page for bidding 400 and peruses the items. In the web page shown in FIG. 4(A), a buying user specifies the desired combination of items among the grouped items, then going to the web page shown in FIG. 4(B), the bid calculation engine 16 in the item introduction module 14 calculates the maximum amount for the specified combination of items, and displays its value to the maximum price field 440 of the web page for bidding 400 (FIG. 4(B)) that is displayed on the web browser 31 of the buying user terminal 30.

In the auction implemented by the embodiment of the present invention, a buying user is permitted to bid for a desired combination of items among grouped items. Successful bidders are determined in finding the combination of bids that maximizes the total price. Therefore, the price presented in the maximum price field 440 as a maximum bidding price for the combination of items which the buying user specified, must be set such that the trade is established without buyers overlapping, ensuring this combination of items, and making the total price maximal. An operation of the bid calculation engine 16 will be described later in detail.

A buying user refers to the maximum price field 440 in the web page for bidding 400 (FIG. 4(B)), and if he or she wants to buy those items at a higher price than the shown price, inputs any bid in the bid input field 450 and clicks the send button 460 (shown by (7) and (8) in FIG. 2). Then, the bidding accept module 15 accepts the bidding for the combination of items.

After the bidding accept module 15 accepts the bidding from the buying user terminal 30, it passes the information about the buying user (ID information, etc.) and the content of the combination of items and the bid to the total amount maximizing engine 17 (shown by (9) in FIG. 2).

When the total amount maximizing engine 17 receives information from the bidding accept module 15, it calculates a combination of bids that maximizes the total price among bids for the entire grouped items so far (shown by (10) and (11) in FIG. 2). In other words, it finds the combination that maximizes the total amount of bids among all combinations of buying users, within a range not exceeding the number of items included in the grouped items.

Now let's consider a concrete example, assuming that items A, B and C are grouped together, and bids have been made as the following combinations of items:

A: 100 yen, 200 yen
B: 300 yen

C: 200 yen

A+B: 300 yen, 400 yen

A+C: 500 yen

In this case, a combination that maximized the total amount of bids is a combination of A+C=500 yen and B=300 yen, resulting in 800 yen in total.

A method for finding this combination is not particularly limited, so that various methods are employed. One approach is to calculate the total amount of bids for all combinations where no bidders overlap for each item, and to select a combination that maximizes the total amount among them. Generally, as to the grouped items traded at auction, it seems that the number of items composing the group dose not increase so much. Therefore, even if the method for calculating the total amount of bids for all combinations is employed, it rarely results in inconvenience.

Hereinafter, we call a buying user who composes a combination of buying users that maximizes the total amount of bids as maximum amount presenter. Also, the total amount of bids in this case is referred to as maximum bidding price total. That is, in the above example, a buying user who bid 500 yen for a combination of item A and item C and a buying user who bid 300 yen for item B are the maximum amount presenters, and 800 yen for this combination is the maximum bidding price total.

After the above processing, the total amount maximizing engine 17 notifies the bidding accept module 15 that the processing for acceptance of bidding has been completed.

When the bidding accept module 15 receives a notification from the total amount maximizing engine 17, it notifies the buying user terminal 30 that the acceptance of bidding has been completed (shown by (12) and (13) in FIG. 2). Also, it notifies the former buying user who has dropped off from a maximum amount presenter and a buying user who has newly become a maximum amount presenter to that effect by E-mail and so on.

As described above, after having received bidding from a buying user and the time for acceptance of bidding has ended, the auction server machine 10 decides on the final maximum amount presenters as a successful bidder of these items. Then, the notification module 18 notifies the selling user terminal 20 of the result of the closing bids (shown by (14) and (15) in FIG. 2). Since the buying users have been notified of the maximum amount presenters, they might need not be notified any more, however, they may be notified of the result of closing bids separately.

Now the operation of the bid calculation engine 16 will be described with citing a concrete example.

Assume that the following items are grouped, and that the current maximum bidding price total is 10,000 yen:

Aggregate of items: P=3; Q=2; R=1; and S=1

Maximum bidding price total: 10,000 yen

Here assume that a buying user(a) intends to buy two of the items P and one of the items R. In this case, the aggregate of items is divided into the following two segments:

(1) Segment of items which buying user(a) purchases: P=2; and R=1

(2) Segment of items which buying user(a) does not purchase: P=1; Q=2; and S=1

The maximum bidding price total of the aggregate of items shown in the above (2) is calculated by the total amount maximizing engine 17. In this case, inputs to the total amount maximizing engine 17 are the aggregate of items shown in the above (2), and remaining buyers as a result of excluding buyers who bid for two or more of items P and buyers who bid for item R from all buyers who bid for the grouped items, in other words, the aggregate of buying users who do not overlap with the buying user(a) in terms of the desired items.

As the result of calculation of the maximum bidding price total, assume that the total amount of bids for the aggregate of items shown in the above (2) is 6,000 yen. In this case, if the buying user (a) bids greater than 4,000 yen for the above aggregate (1) of items, the total amount of bids for all items becomes greater than 10,000 yen, so that the total price increases.

In this way, the current maximum bidding price for the combination including two of the items P and one of the item R is calculated as 4,000 yen, and presented to the maximum price field 440 of the web page for bidding 400.

Figure 5:
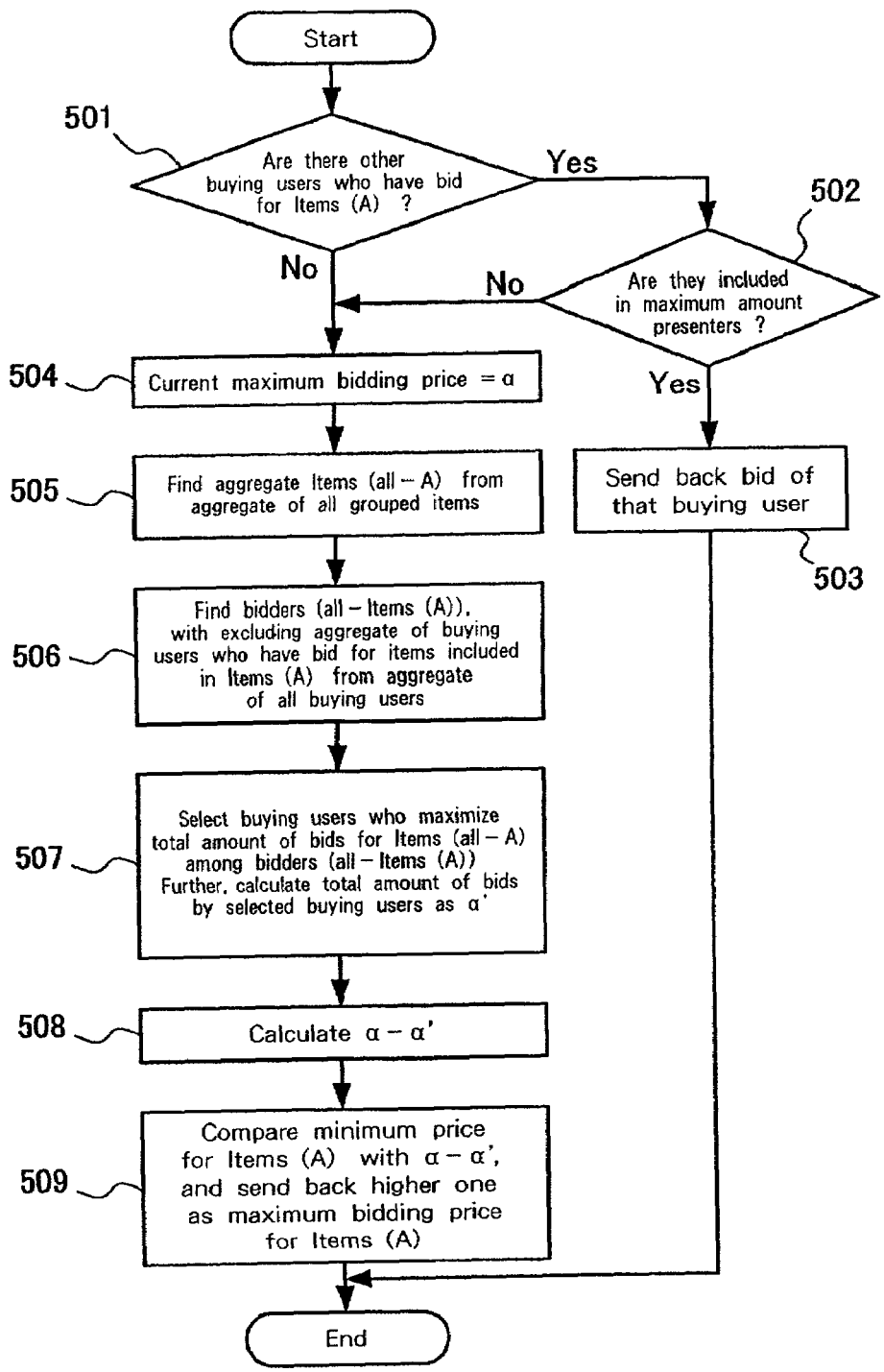
FIG. 5 is a flowchart illustrating an operation of the bid calculation engine according to the embodiment of the present invention.

Next, the calculation scheme for the above discussion will be described. FIG. 5 is a flowchart illustrating the calculation process.

As an initial condition, assume that a buying user(a) makes a bid for the desired combination of items (hereinafter referred to as Items(A)) among the predetermined grouped items from the buying user terminal 30.

Referring to FIG. 5, it is determined whether there are other buying users who have already bid for the same combination of items as the one the buying user(a) desired (i.e. Items(A))(step 501). If such other buying users exists, then it is determined whether those other buying users are a maximum amount presenter (step 502). If those other buying users are one of maximum amount presenters, the bid by such other buying users is sent back to the buying user terminal 30 as the maximum bidding price for the combination of Items(A)(step 503), and the process ends.

On the other hand, if there is no other buying users who have bid for the same combination as Items(A) (No at step 501), or if such buying users exist but they are not the maximum amount presenter (No at step 502), then the inputs to the total amount maximizing engine 17 are found.

First, the current maximum bidding price is calculated and referred to as α (step 504). Next, with excluding Items(A) from the aggregate of all grouped items (referred to as Items(all)), an aggregate Items(all-A) is found (step 505). Also, with excluding the aggregate of buying users who have bid for the items included in Items(A) (referred to as bidders(Items(A))) from the aggregate of all buying users who have bid for the grouped items (referred to as bidders (all)), the aggregate of bidders (referred to as bidders(all-Items(A)) is found (step 506). The above results become the inputs to the total amount maximizing engine 17.

Next, the aggregate of items, Items(all-A), and the aggregate of buying users, bidders(all-Items(A)); are input to the total amount maximizing engine 17. Then, buying users who maximize the total amount of bids for the aggregate of items, Items(all-A), are selected among the aggregate of buying users, bidders(all-Items(A)). Furthermore, the total amount of bids by selected buying users is calculated and referred to as α' (step 507).

Finally, the difference between α and α' is calculated (step 508). If a selling user set the minimum price for Items(A), comparing that minimum price for Items(A) with the difference between α and α', then selecting the higher one as the maximum bidding price for the combination of Items(A) and sending it back to the buying user terminal 30 (step 509). Then, the process ends.

It should be pointed out that in step 507, there might be an item in the aggregate of items, Items(all-A), which no buying users have bid for, who were selected among the aggregate of buying users, bidders(all-Items(A)), to maximize the total amount of bids for Items(all-A). In this case, an additional processing may be performed to specially present this item to the buying user(a) as an item he or she can buy at a cheap price in order to urge the purchase.

As mentioned above, the present invention permits a buying user to bid for a desired combination among grouped items subject to auction that are composed of multiple items collectively. When a bid is made for a part of the grouped items, regardless of whether there are other buying users who have bid for that part of items or not, it determines at what bid a buying user can become a maximum amount presenter for the grouped items. That is, a buying user can make a bid as if the auction were conducted for the combination of items he or she has selected among the grouped items.

According to the above example, when a bid is made for grouped items or part of them, the bid calculation engine 16 calculates the amount for the combination of items subject to bidding so as to reach the current maximum bidding price for the grouped items. However, the timing to calculate the amount may be any time as long as before a bid is made and after the accepting process for the last bidding has been completed. Therefore, after the accepting process for one bid has been completed, the amount to reach the maximum bidding price at that time may be immediately calculated, in terms of all combinations of items composing the grouped items, using the bid calculation engine 16.

For example, consider the items A, B and C described in the above example where the total amount maximizing engine 17 determines the maximum amount presenters and the maximum bidding price total. Biddable combinations of items include the following seven combinations: A, B, C, A+B, B+C, C+A, A+B+C. In this example, the maximum bidding price total is 800 yen, so that for each combination, the amount necessary to reach that maximum bidding price total 800 yen is as follows:

A: 300 yen (with bids of B=300 yen and C=200 yen sums up to 800 yen)

B: 300 yen (with bid of A+C=500 yen sums up to 800 yen)

C: 300 yen (with bids of A=200 yen and B=300 yen sums up to 800 yen)

A+B: 600 yen (with bid of C=200 yen sums up to 800 yen)

B+C: 600 yen (with bid of A=200 yen sums up to 800 yen)

C+A: 500 yen (with bid of B=300 yen sums up to 800 yen)

A+B+C: 800 yen (sums up to 800 yen)

Here the amount for each combination of items is calculated immediately after the accepting process for bidding has been completed, and it is stored in the item management database 12 and the bid management database 13. When next bid is made, the amount for the combination of items subject to that bidding is read from the bid management database 13 and displayed to the maximum price field 440 in the web page for bidding 400 shown in FIG. 4(B). In this way, when a new bid is made from a buying user terminal 30, there is no need to calculate the amount to be displayed in the maximum price field 440, thereby leading to fast processing.

As mentioned above, according to the present invention, when multiple items are exhibited collectively at auction, a unit of items subject to auction can be flexibly and dynamically set. Hereby, a selling user can select a combination of buyers which maximizes the total price among a variety of combinations of bids to knock down.

According to the present invention, when multiple items are exhibited collectively at auction, a buying user can participate in the auction such that the auction is hypothetically conducted in relation to any combination of items or individual items which he or she has selected.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An auction system for providing an auction service via a communication network, the system comprising an auction server and user terminals which are connected to said communication network, wherein the improvement comprises:

said user terminals configured to specify a single item or any combination of items for bidding when multiple items are sold as grouped items at the auction held by said auction server;

said auction server configured to decide on successful bidders for bids made on a variety of combinations of said grouped items from said user terminals, such that the items composing said grouped items do not overlap to multiple bidders;

said auction server configured to calculate what price should be bid for the combination of items that was specified by said user terminal, in order to maximize the total amount of bids for all items while ensuring said combination of items, and presents the obtained price to said user terminal as a maximum bidding price so far for said combination of items;

said auction server configured to exclude an aggregate P of items subject to bidding from said grouped items to find an aggregate Q of remaining items;

said auction server excludes an aggregate X of buyers who have bid for the items included in said aggregate P, from all buyers who have bid for said grouped items and the items that compose said grouped items, thereby finding an aggregate Y of remaining buyers;

said auction server, among all bids that have already been made for said grouped items and the items that compose said grouped items, configured to find a total price of bids for a combination that maximizes the total price; and said auction server configured to subtract from an obtained price the total price calculated based on said aggregate Q of items and said aggregate Y of buyers.

2. The auction system according to claim 1, wherein said auction server selects a combination of bids that maximizes a total amount of bids among said variety of combinations of bids for said grouped items, and decides on each buyer who made said bids as a successful bidder.

3. An auction server assisting a network auction to bid for items subject to auction via a communication network, the auction server comprising:

item-introduction means for publishing items subject to said auction on said communication network;

bid accepting means for accepting a bid for a single item or any combination of items when multiple items are sold as grouped items;

total amount maximizing means for determining a combination of bids that maximizes a total amount of bids among a variety of combinations of bids for items accepted by said bid accepting means, wherein after the time for acceptance of bidding has elapsed, the auction server decides on each buyer who made a bid corresponding to the combination determined by said total amount maximizing means as a successful bidder;

bid calculating means for calculating what price should be bid for the combination of items subject to bidding, in order to maximize the total amount of bids for all items with ensuring said combination of items;

means for presenting the obtained price by said bid calculating means to a buyer who intends to bid for said combination of items as a maximum bidding price so far for said combination of items; and wherein said bid calculating means:

makes said total amount maximizing means determine a combination A of bids that maximizes the amount of bids, among bids that have already been made for items in said grouped items excluding said combination of items subject to bidding; and among all bids that have already been made for said grouped items and the items that compose said grouped items, finds a total amount of bids for a combination B that maximizes the total amount; and subtracts the total amount for said combination A from the total amount for said combination B; and sets the subtraction result as the maximum amount for said combination of items subject to bidding.

4. The auction server according to claim 3, wherein when a bid has already been made for the same combination as said combination of items subject to bidding, and said past bid is included in the combination determined by said total amount maximizing means, said bid calculating means sets said past bid as a maximum bidding price so far for said combination of items.

5. A system for participating in a network auction, said system comprising:

an auction server configured to:
  accept a bid for a single item or any combination of items when multiple items are sold as grouped items;
  determine a combination A of bids that maximizes the amount of bids, among all bids that have already been made for items in said grouped items excluding said combination of items subject to bidding;
  find a total amount of bids for a combination B that maximizes the total amount among all bids that have already been made for said grouped items and the items that compose said grouped items;
  subtract the total amount for said combination A from the total amount for said combination B;
  set a total amount as the maximum amount for said combination of items subject to bidding; and
  decide on each buyer who has made a bid corresponding to the determined combination as a successful bidder after a time for acceptance of bidding has elapsed; and a user terminal including:
  item specifying means for specifying a single item or any combination of items for bidding when multiple items are sold as grouped items and sending the specified items to said auction server;
  maximum amount presenting means for presenting a maximum bidding price so far for the items specified for the bidding that was received from said auction server; and
  bidding means for inputting and sending bids to said auction server.

6. The user terminal according to claim 5, wherein said maximum amount presenting means receives a necessary amount for the combination of items specified by said item specifying means from the auction server, such that a total amount of bids reaches the maximum among a variety of combinations of bids for items that compose said grouped items, and presents said received amount as a maximum bidding price so far for said combination of items.

7. An auction method for performing a network auction via a communication network using an auction server, the method comprising the steps of:

publishing items subject to said auction on said communication network;

accepting a bid for a single item or any combination of items when multiple items are sold as grouped items;

determining a combination of bids that maximizes a total amount of bids among a variety of combinations of bids for items accepted;

after the time for acceptance of bidding elapsed, deciding on each buyer who made a bid that maximizes the total amount of bids as a successful bidder;

calculating what price should be bid for the combination of items subject to bidding in order to maximize the total amount of bids for all items including said combination; and presenting the obtained price to a buyer who intends to bid for said combination of items as a maximum bidding price so far for said combination of items;

excluding an aggregate P of items subject to bidding from said grouped items to find an aggregate Q of remaining items;

excluding an aggregate X of buyers who have bid for the items included in said aggregate P, from all buyers who have bid for said grouped items and the items that compose said grouped items, thereby finding an aggregate Y of remaining buyers;

passing said aggregate Q of items and said aggregate Y of buyers to said determining step to calculate the maximum bidding price;

among all bids that have already been made for said grouped items and the items that compose said grouped items, finding a total amount of bids for a combination that maximizes the total amount; and subtracting from said total amount the total amount calculated based on said aggregate Q of items and said aggregate Y of buyers.

8. An auction method for performing an auction via a communication network using an auction server and user terminals connected to said communication network, the method comprising the steps of:

said user terminals specifying a single item or any combination of items for bidding when multiple items are sold as grouped items at the auction held by said auction server;

said auction server deciding on successful bidders for bids made on a variety of combinations of said grouped items from said user terminals, such that the items composing said grouped items do not overlap to multiple bidders and the total price for said grouped items becomes maximal;

excluding an aggregate P of items subject to bidding from said grouped items to find an aggregate Q of remaining items;

excluding an aggregate X of buyers who have bid for the items included in said aggregate P, from all buyers who have bid for said grouped items and the items that compose said grouped items, thereby finding an aggregate Y of remaining buyers;

among all bids that have already been made for said grouped items and the items that compose said grouped items, finding the total price of bids for a combination that maximizes the total price; and subtracting from said total price the total price calculated based on said aggregate Q of items and said aggregate Y of buyers.

9. The auction method according to claim 8, wherein said step for deciding on successful bidders comprises the steps of:

calculating at any time a combination of bids that maximizes a total amount of bids among said variety of combinations of bids for items; and after the time for acceptance has elapsed, deciding on each buyer who made a combination of bids that maximizes the total amount of bids at that time as a successful bidder.

10. An auction method for performing an auction via a communication network using an auction server and user terminals connected to said communication network, the method comprising the steps of:

said user terminals specifying a single item or any combination of items for bidding when multiple items are sold as grouped items at the auction held by said auction server;

said auction server calculating what price should be bid for the item or the combination of items that were specified by said user terminals, in order to maximize the total amount of bids for all items while ensuring said combination of items;

excluding an aggregate P of items subject to bidding from said grouped items to find an aggregate Q of remaining items;

excluding an aggregate X of buyers who have bid for the items included in said aggregate P, from all buyers who have bid for said grouped items and the items that compose said grouped items, thereby finding an aggregate Y of remaining buyers;

among all bids that have already been made for said grouped items and the items that compose said grouped items, finding a total price of bids for a combination that maximizes the total price; and subtracting from an obtained price the total price calculated based on said aggregate Q of items and said aggregate Y of buyers;

said auction server presenting the obtained price to the user terminal as a maximum bidding price for this item or the combination of items;

said user terminal bidding a price higher than said presented maximum amount; and said auction server deciding on successful bidders for bids made on said grouped items from said user terminals, such that the items composing said grouped items do not overlap to multiple bidders and the total price for said grouped items becomes maximal.

11. A bidding method for connecting to an auction server via a communication network, participating in a network auction held on said communication network, and bidding for items subject to said auction, the method comprising the steps of:

specifying a single item or any combination of items for bidding when multiple items are sold as grouped items and sending the specified items to said auction server;

presenting a maximum bidding price so far for the items specified for the bidding that was received from said auction server;

inputting and sending bids to said auction server;

determining a combination A of bids that maximizes the amount of bids, among bids that have already been made for items in said grouped items excluding said combination of items subject to bidding;

finding a total amount of bids for a combination B that maximizes the total amount among all bids that have already been made for said grouped items and the items that compose said grouped items;

subtracting the total amount for said combination A from the total amount for said combination B;

setting a total amount as the maximum amount for said combination of items subject to bidding; and deciding on each buyer who has made a bid corresponding to the determined combination as a successful bidder after a time for acceptance of bidding has elapsed.

12. The bidding method according to claim 11, wherein said presenting step comprises the step of receiving a necessary amount for the specified combination of items as a maximum bidding price so far for said combination of items, such that a total amount of bids reaches to the maximum among a variety of combinations of bids for items that compose said grouped items.

13. A computer readable medium for storing a program of computer-implementable instructions, said instructions, when implemented, causing a computer to carry out a process comprising the operations of:

publishing items subject to auction on a communication network;

accepting a bid for a single item or any combination of items when multiple items are sold as grouped items;

determining a combination A of bids that maximizes the amount of bids, among bids that have already been made for items in said grouped items excluding said combination of items subject to bidding;

finding a total amount of bids for a combination B that maximizes the total amount among all bids that have already been made for said grouped items and the items that compose said grouped items;

subtracting the total amount for said combination A from the total amount for said combination B;

setting a total amount as the maximum amount for said combination of items subject to bidding; and after the time for acceptance of bidding has elapsed, deciding on each buyer who made a bid corresponding to the determined combination as a successful bidder.

* * * * *

Disclaimer

Patent No. 7,039,609 - Yoshinori Aoki, Yokohama, JP. AUCTION SYSTEM, AUCTION SERVER, USER TERMINAL, AUCTION METHOD, BIDDING METHOD, STORAGE MEDIA AND PROGRAM TRANSMISSION APPARATUS. Patent dated May 02, 2006. Disclaimer filed Oct. 06, 2006, by the assignee, INTERNATIONAL BUSINESS MACHINES CORPORATION.

Hereby enters this disclaimer to all claims and the entire term of said patent.

(*Official Gazette September 23, 2008*)